United States Patent [19]

Entzmann

[11] 4,065,321

[45] Dec. 27, 1977

[54] PROCESS FOR THE PRODUCTION OF CEMENT CLINKER FROM FUEL SHALE

[76] Inventor: Karl Entzmann, 10, Eichbergstrasse, A-2371 Hinterbruhl, Austria

[21] Appl. No.: 737,013

[22] Filed: Oct. 29, 1976

[30] Foreign Application Priority Data

May 6, 1976 Austria .................................. 3334/76

[51] Int. Cl.$^2$ ............................................. C04B 7/44
[52] U.S. Cl. .................................. 106/106; 106/103
[58] Field of Search ............................... 106/100, 103

[56] References Cited

U.S. PATENT DOCUMENTS

| | | | |
|---|---|---|---|
| 1,536,165 | 5/1925 | Tetens | 106/100 |
| 2,904,445 | 9/1959 | Sellers et al. | 106/100 |
| 3,127,455 | 3/1964 | Culbertson et al. | 106/100 |
| 3,972,724 | 8/1976 | Entzmann | 106/103 |

*Primary Examiner*—J. Poer
*Attorney, Agent, or Firm*—Imirie, Smiley & Guay

[57] ABSTRACT

An argillaceous and/or calcareous material, such as a fuel shale, for example an oil shale, which is capable of yielding a cement clinker, is subjected to mechanical disintegration by the particles formed thereby to repeated acceleration and retardation within a period of less than about 0.05 second, thereby homogenizing and activating them, and then sintering the disintegrated material at a temperature between about 900° and about 1300° C for a period between about 3 and about 10 minutes, to form a cement clinker. Other materials such as $SiO_2$, $CaO$ and $R_2O_3$ ($Al_2O_3$ or $Fe_2O_3$) may be admixed to improve clinker properties. The sintered clinker may be further subjected to mechanical disintegration in an impact-type disintegration.

8 Claims, 1 Drawing Figure

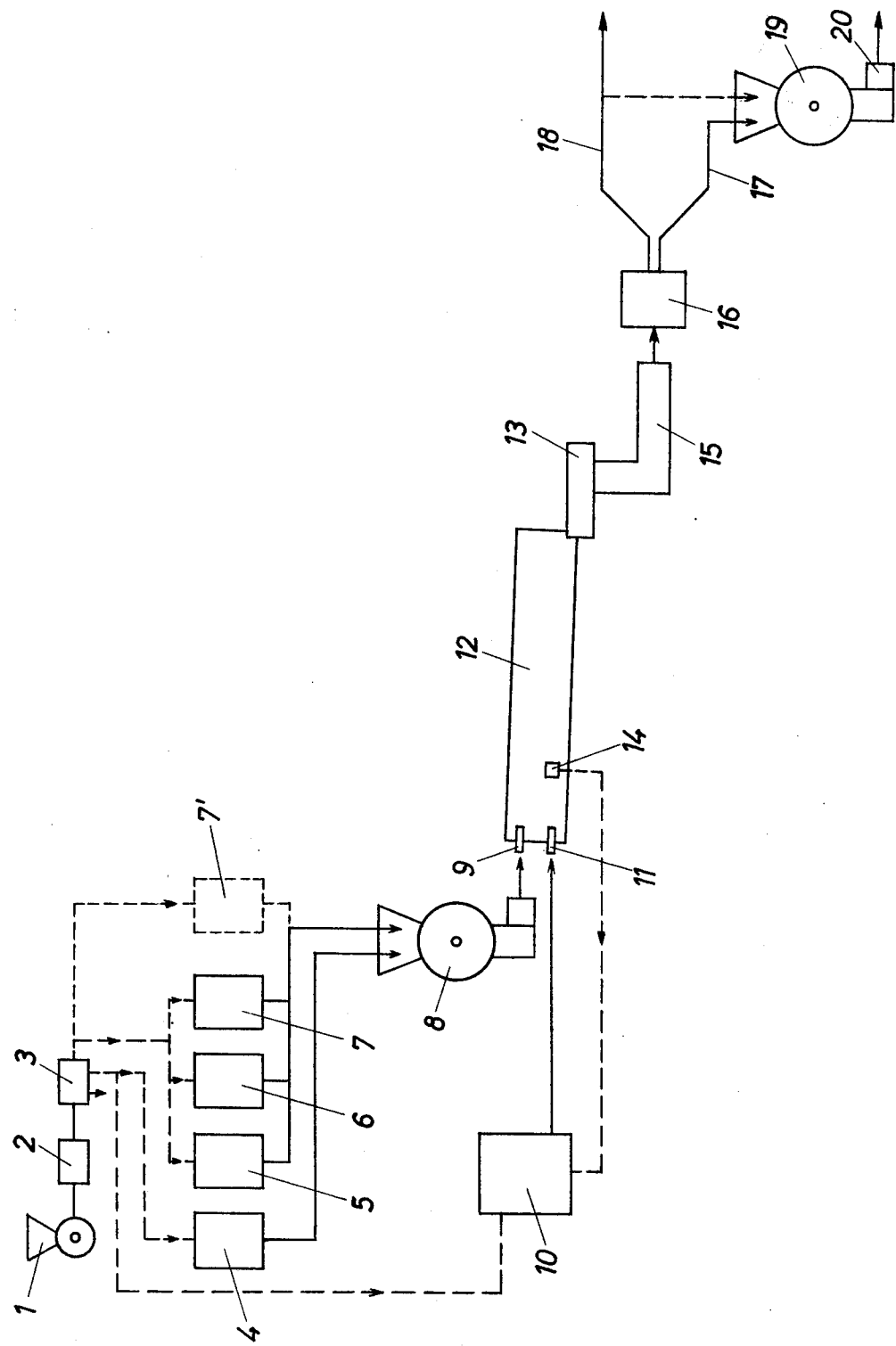

PROCESS FOR THE PRODUCTION OF CEMENT CLINKER FROM FUEL SHALE

BACKGROUND OF THE INVENTION

The present invention relates to a novel process for the production of cement clinker from fuel shale, or other argillaceous and/or calcareous materials. The practice of the invention will be illustrated with respect to carbonaceous shale, such as oil shale or coal shale, but it is to be understood that it is not to be considered as limited thereto, but is applicable to a variety of calcareous and argillaceous raw materials commonly employed for the production of cement clinker, such as clay, blast furnace slag, and mixtures thereof with limestone or marl.

It is known that disintegrable combustible materials having a high mineral content, such as oil shale or coal shale, can be burned in specially designed steam boiler plants to produce heat and/or electric power. In the design of such boiler plants, special consideration must be given to the properties of the fuel, such as a lower heat load transfer rate per unit of area and the need for mechanical cleaning to remove materials which tend to deposit, such as lime, clay, and the like.

Whereas the fuel shale can be disintegrated to the required small particle size in grinding units, such as ball mills, these do not sufficiently change the structure of the material. The ash and slag which are produced in the combustion give rise to severe problems regarding ecological pollution because dry ash is blown off by the wind unless the ash dumps are continually moistened, and because they may contaminate underground water supplies.

It is known that the combustion of fuel shales in steam boiler plants can be improved in its overall economy by first subjecting the dry fuel shale to mechanical disintegration in a pin-type disintegrator in which the particles formed are subjected to repeated acceleration and retardation within a very short time interval of the order of fractions of a second, thereby homogenizing and activating at least a part of the shale, and a process of this type is disclosed in U.S. Pat. No. 3,972,724. It permits yields of 50% and more cement clinker in the combustion ash.

The ash and the cement clinker have to be separated in a further operation. Consequently, part of the combustion residue is waste, since the combustion ash cannot be effectively transformed into cement clinker.

Furthermore, oil shale, the inorganic component of which is suitable as a starting material for the production of cement clinker has been employed for this purpose in various prior art methods involving the separation of the organic from the inorganic components, so as to utilize the organic components economically for the production of energy, or at least removing them in a way not detrimental to the environment, and at the same time endeavoring to convert the inorganic components into cement clinker of the desired properties. Such methods have included subjecting the comminuted and granulated oil shale to a low temperature process to volatilize the organic components or to burn them, e.g. in a fluidized bed. The heat can be used to generate steam.

These known methods had, however, several disadvantages, such as that the quality of the final products obtained, i.e., the cement clinker, varied widely, and these variations were scarcely influenced by the manner of the heat treatment.

It is also known from said U.S. Pat. No. 3,972,724, that in the combustion of the oil shale, the residue could be separated, owing to differences in specific gravity, into cement clinker material on one hand, and ash and slag on the other hand, for example by centrifuging, and then the cement clinker portion could be considerably improved in its properties by subjecting it to a mechano-chemical process of activation in suitable disintegrators, to produce an increase in its chemical reactivity.

GENERAL DESCRIPTION OF THE INVENTION

In accordance with the present invention, it has been found that in the production of cement clinker from any given suitable argillaceous and/or calcareous starting material, such as, for example, oil shale, but not limited thereto, special advantages with regard to ease and completeness of separation of the heat-treated starting material into cement clinker on one hand and into by-products such as ash and slag on the other hand, and substantial improvement in the quality of the cement clinker itself, result from the following process steps: (1) the starting material is first subjected, for the purpose of activation, to mechanical disintegration of the type known as mechano-chemical treatment, as described more fully below, and (2) subjecting the thus treated starting material to sintering in a suitable sintering apparatus at an elevated temperature, instead of to combustion in a furnace, as in the prior art.

The physical foundations of the disintegration as employed in the present invention are found in mechano-chemistry (tribomechanics), a field which is concerned broadly with the chemical and physiochemical changes which are induced in solids under the action of mechanical energy. An important cause of the change of the behavior of a material is the change of its lattice structure, primarily the formation of disordered portions. These changes in structure induce an activation of the solid, i.e., an acceleration of the chemical and physiochemical processes which take place on the solid. The degree of activation depends on the structure of the solid which is subjected to mechano-chemical processing and on the intensity and nature of the mechanical forces to which it is subjected.

Where periodically acting forces are exerted, the intensity of the treatment depends upon the amplitude and frequency of the energy which is applied. It has been found, for example, that when particulate material to be activated is passed through a pin beater mill (disintegrator), the particles are subjected to repeated accelerations and retardations within a fraction of a second by the pins carried by the rotor. The mechanical energy which is applied to the particles during a treatment for several hours in a ball mill or in a vibrating mill, athough the latter has a much higher efficiency than a ball mill.

Tribochemical disintegrating and activating processes of the kind described above are known and are described in the book of W. Hinz, "Silikate", Vol. 2, VEB Verlag fuer Bauwesen, Berlin 1971, pages 375–376.

In the first step of the present process, the dry fuel shale or other suitable starting material is subjected to mechanical disintegration in, for example, a pin-type disintegrator in which the particles formed are subjected to repeated acceleration and retardation within a period of less than about 0.5 second, thereby homogenizing and activating at least a part of said shale.

In the sintering step, which may employ, for example, an inclined sintering drum of conventional type, the disintegrated starting material (shale) is sintered at a temperature of at least about 900° C, and up to about 1200° C or more, e.g., 1300° C, preferably between about 1000° and 1100° C, for a period between about 3 and about 10 minutes, preferably about 5 minutes.

Employing a pin-type disintegrator to activate the shale, it has been found advantageous to expose the dry shale in the disintegrator, for a very short interval, about $10^{-2}$ to $10^{-3}$ seconds, and to 3 to 8 impacts.

The distinction between, and the advantage over, the process of U.S. Pat. No. 3,972,724, afforded by the improvement of the present invention, lies in that in the patented method, a combustion of the combustible shale has to take place, and the cement clinker can be obtained only from the combustion residue, namely clinker plus ash, by physical separation.

The use of the first or activation step permits the sintering temperature to be reduced by about 80° to 100° C, and the sintering time by about 15% to 20%, permitting greater cement clinker production from existing installations.

In the sintering drum, which may be, for example, oil-fired, the heat developed will produce volatilization of the organic compounds of the shale or other material, leaving the residue which is then subjected to the sintering action in situ.

It is within the contemplation of the present invention, however, to burn the combustible shale in a separate plant for any other technical purpose, e.g. production of energy, whereby the ash therefrom, which would normally be considered a waste material creating problems of disposal and pollution, can be transferred to the disintegrating and unit sequence of the present process and transformed into a cement clinker of good properties to an extensive degree.

The same is true of other starting materials whose ash, which may be admixed with suitable additives, can be transformed by sintering into a suitable cement clinker.

Where such ash is employed in the present process, it is subjected to the action of the disintegrator, prior to sintering, finely divided additives which are necessary for a hydraulic binding medium where the starting material is of a mineralogical nature deficient in such components which are necessary for the desired clinker properties. Such additives include, for example, $SiO_2$ (arenceous quartz), CaO or $CaCO_3$ (lime or limestone), and mineral oxides of the composition $R_2O_3$, e.g., $Al_2O_3$ or $Fe_2O_3$ (clay). They are added in an amount sufficient to produce, upon sintering, a product containing from about 60% to about 80% by weight of cement clinker.

Where such additives are employed, the required sintering time increases, and also the required sintering temperature is higher, and may rise, for example, to 1250° C.

The sintered product, if necessary, is subjected to a separation step to free the cement clinker material from any unconverted ash and slag.

The sinter product may then be activated, if desired, in a disintegrator, in the same manner as the starting material. Thus, the separated cement clinker may be disintegrated in an impact-type mill in which each clinker particle is subjected within a period of preferably less than about 0.01 second, to 3 to 8 impacts by beating elements which move at a velocity of at least 15 meters per second, preferably 50-250 meters per second.

DESCRIPTION OF THE PREFERRED EMBODIMENTS

The practice of the invention will be better understood by reference to the accompanying drawing, and the explanatory description thereof, which is however, to be considered as exemplary, and not as limiting the invention thereto.

The drawing shows a laboratory disintegrator 1 which serves to pulverize a small portion of the respective material to be burnt, e.g. oil shale. This disintegrator 1 is succeeded by an X-ray microanalyzer 2 for examining the structure of the disintegrated raw material and an electronic data processing system 3. Items 4, 5, 6 and 7 are storage bins for the starting material such as oil shale and for additives, e.g., $SiO_2$, CaO and $R_2O_3$. The starting material which has been analyzed is fed into bin 4. The data resulting from the analysis are stored in the data-processing system.

All four bins are succeeded by a common disintegrator 8 which supplies a highly fine-grained mixture of starting material and admixtures to the feeding nozzle 9 of the inclined sintering drum 12. There is also a fuel oil storage tank 10, which feeds the auxiliary oil burner 11 of the sintering drum 12.

The sintering drum has a temperature sensor 14, which is connected to the oil shale storage bin 10. On the other hand, the bin 4 and the tank 10 are operatively connected to the electronic data-processing system 3. All these operational connections are shown in the drawing by dash lines.

The sintering drum is provided with a collecting means 13 and with a discharge system 15 which supplies a separator 16. The latter may consist of an air separator or a centrifuge. Materials handling lines 17 and 18 which preferably include belt coneyors succeed the separator 16. The materials handling line 18 carries off ash and slag contained in the combustion residue for further utilization. Cement clinker which in the separator 16 has been separated from the other constituents of the combustion residue is carried by the materials handling line 17 to a disintegrator 19, which is provided according to the invention and has a discharge system 20.

The described plant has the following mode of operation: A small portion of the raw material supplied, e.g., oil shale, to the plant is disintegrated in the laboratory disintegrator 1 and is then supplied to the X-ray microanalyzer 2, where the structure of the material is analyzed. The results of this analysis are fed to the data-processing system 3. The latter controls on the one hand the rates at which raw material from the bin 4 and, if desired, admixtures from the bins 5, 6, 7 are fed to the disintegrator 8 and then to the sintering drum and on the other hand the rate at which oil used as auxiliary fuel must be fed to the oil burner 11 to maintain the prescribed minimum heat production rate which is required for the furnace. It is apparent that the data processing system must determine the rate at which oil is required as an auxiliary fuel. The latter rate will depend on the heating value of the raw material which has been supplied. The data-processing plant must also determine the rates at which mixtures are added. The latter rates will depend on the also varying composition of the mineral components of the raw material.

In addition, the controlled rates of raw material and oil will also depend on the temperature in the sintering drum 12.

The combustion residue coming from the sintering drum contains ash and slag and for the major part consists of an amount of about 60 to 75% by weight of cement clinker. The combustion residue is taken up by the collecting means 13 and led to the discharge system 15 where it is cooled and immediately thereafter fed to the separator 16.

In the latter, the much heavier cement clinker is separated from the lighter ash and slag constituents by centrifuging or an air stream in an air separator.

The ash and slag constituents of the combustion residue are carried off by the materials-handling line 18 for any desired further utilization. This is not explained more fully because it is not part of the invention.

By means of the materials-handling line 17, the cement clinker is fed to the disintegrator 19, which in accordance with the invention is provided at this point of the production line. In the disintegrator 19, the cement clinker is subjected to impact-type disintegration, whereby a cement powder is formed, which is carried by a discharge system 20 to a bag-filling and closing plant, now shown, or directly to a plant for making concrete.

The disintegration in the disintegrator activates the cement powder so that the concrete in which the cement powder is incorporated has a much higher crushing strength. An example of the process according to the invention carried out in a plant of the kind just described, will not be described.

Oil shale which contains 47.63% combustible constituents and 52.37% ash and which has a lower heating value of 2500 kcal/kg is to be treated in the sintering drum. A grade PZ 275 cement, i.e., a Portland cement having in the cured state a crushing strength of 275 kp/cm2, should be produced from the combustion residue.

In view of the mineralogic composition of the oil shale, admixtures in an amount of 13.63% of the weight of the oil shale were added to the latter to enable the production of a cement having the desired quality. These admixtures consisted of $SiO_2$, CaO, and $R_2O_3$. As a result of the addition of these incombustible admixtures, the mixture of oil shale admixtures to be fed to the furnace had a heating value of only 1784 kcal/kg so that additional heat was required at a rate of 2500-1784/716 kcal/h. Heat at this rate was produced by an additional combustion of fuel oil having a lower heating value of 9500 kcal/kg. The oil requirement was thus $$\frac{716 \text{ kcal/kg}}{9500 \text{ kcal/kg}} = 0.075 \text{ kg oil per kg oil shale},$$

corresponding to about 14 metric tons of fuel oil per hour.

The rates at which oil shale and fuel oil were supplied to the sintering drum were controlled in dependence on the temperature in the sintering drum.

The combustion residue discharged from the sintering drum was cooled without using water. The cooled combustion residue was subjected to centrifugal separation to separate the clinker minerals from the other components (ash and slag) of the combustion residue. Because the clinker has a much higher specific gravity than all other components of the combustion residue, it can be separated with high efficiency. The combustion residue contained about 62.5% clinker minerals, based on the total weight of the combustion residue. The clinker which had thus been recovered was disintegrated and thus activated in a disintegrator, in which each particle size of the clinker was subjected in intervals of time of less than 0.5 second to three to eight impacts by the beater pins on the drum of the disintegrator. These pins move at a velocity (peripheral velocity) in excess of 15 meters per second. As a result, the individual clinker particles are not subjected to attrition but are cleaved along lattice planes of the space lattice so that the activation results.

The resulting cement had in the fully cured state a strength of 384 kp/cm2 and more and was thus much stronger than cement which had been obtained by a mere grinding of clinker produced in the same manner.

The ash and slag constituents separated from the clinker were utilized in accordance with Austrian Patent specification No. 295,381. For this purpose they were further disintegrated and were moistened and then charged into molds, e.g., for the manufacture of building stones. The moldings were then subjected to hydraulic-thermal drying. Alternatively, the ash and slag constituents could be used as admixtures in the making of cement.

If an oil shale having a different mineralogical composition was used so that a different proportion of admixtures was required, a combustion residue could be produced which contained somewhat more than 70% clinker minerals. In such cases it is not necessary to separate the clinker from the other components of the combustion residue and the entire combustion residue can be cooled and then supplied to the disintegrator. It will be understood that the resulting cement has a lower crushing strength than cement made from pure clinker, which is free of ash, but even this crushing strength is higher than that of a cement made from the same starting material when the clinker is merely ground rather than disintegrated by an impact treatment in a disintegrator.

A further embodiment of the invention is the procedure to burn oil shale, e.g., in a boiler plant and to treat the ash, eventually together with the additives mentioned before, in the disintegrator and subsequently in the rotary tubular kiln. For this purpose an additional bin 7' is provided, as shown in the drawing by dot-dash lines, for the ash coming from the boiler plant.

This ash contains cement clinker of strongly varying quality as well as free lime (burnt lime, CaO) and further mineral components.

With this embodiment of the method according to the invention it is required to conduct the ash to a further laboratory disintegrator to determine its composition (i.e. the content of clinker, lime and other mineral constituents) and to feed the respective values into the data processing system into which previously also the values of the composition of the oil shale have been entered. In this way the data processing system 3 is now controlling the rates of ash, additives, oil shale and fuel oil in dependence on the composition of the ash and the oil shale and in dependence on the temperature in the rotary tubular kiln.

With this latter embodiment of the method it is also possible in further development of the invention to work without oil shale, i.e., the bin 4 remains empty (the bin 4 is omitted, respectively) and the laboratory disintegrator 1 is now used for disintegrating the trial quantity of the ash which is then examined in the X-ray instrument. The results of this examination are fed into the data processing system. The data processing system then controls the rates of ash and, if necessary, the rates of the additives which are conducted to the disintegrator 8. Naturally, the rates of the additives depend on the content of ash in clinker and mineral additives. The rate of fuel oil is then only controlled by the temperature sensor 14 in dependence on the temperature in the rotary tubular kiln 12, as the ash does not contain any combustible constituents.

EXAMPLE 1

An oil shale of Estonian quality was employed - composition of the ash:

| | |
|---|---|
| CaO | 26 – 50% |
| $SiO_2$ | 27 – 51 |
| $Al_2O_3$, $Fe_2O_3$ | 12 – 17 |
| MgO | .1.5 – 3 |
| $K_2O$, $Na_2O$ | 3 – 6 |
| S | 0.5 – 3 |

18–22% clay was added to the ash. By disintegrator treatment at 1200° C and a total 5 min. sintering time a cement clinker of the quality 275 was obtained.

In experiments with another type of shale, with less CaO than indicated above, 15 to 25% CaO were added and after the disintegrator treatment at 1100° C and 8 min. sintering time a cement clinker of the quality approximately 275 was obtained.

If the crude powder production for the standard cement clinker production takes place in the disintegrator, the sintering temperature can be reduced by about 80 to 100° C, the sintering time by 15–20%, which means that existing plants can produce more cement clinker.

If cement clinker of the quality 275 is ground in the disintegrator, the following prism crushing resistance values are resulting according to the experiments with 3000 cm²/gr:

| | |
|---|---|
| after 3 days | 236 kp/cm² |
| after 7 days | 364 kp/cm² |
| after 28 days | 487 kp/cm² |

The results of the second series of experiments were as follows:

| | | |
|---|---|---|
| after 3 days | | 239 kp/cm² |
| after 7 days | | 368 kp/cm² |
| after 28 days | | 462 kp/cm² |
| | Standard values: | |
| after 7 days | | 110 kp/cm² |
| after 28 days | | 275 kp/cm² |

What is claimed is:

1. A method of processing an argillaceous or calcareous material capable of yielding a cement clinker to produce a cement clinker therefrom, comprising the steps of:
   a. subjecting said material to mechanical disintegration in a pin-type disintegrator in which the particles formed are subjected to repeated acceleration and retardation within a period of less than about 0.05 second, thereby homogenizing and activating said material; and
   b. sintering said disintegrated material at a temperature of between about 900° C. and about 1300° C. for a period of time between about 3 and about 10 minutes, thus volatilizing any organic components of said material and forming said clinker.

2. The method of claim 1 in which said sintering material is a fuel shale.

3. The method of claim 2 in which said fuel shale is an oil shale.

4. The method of claim 1 in which said starting material is the residue of a combusted fuel shale.

5. The method of claim 1 in which there are admixed with said starting material finely divided $SiO_2$, CaO and $R_2O_3$ in an amount sufficient to produce, upon sintering, a product containing from about 60% to about 75% by weight of cement clinker.

6. The method of claim 1 in which the sintering product of step (b) is subjected to separation to remove unconverted ash and slag from the cement clinker.

7. The method of claim 1 in which the clinker formed in step (b) is subjected to impact-type disintegration to produce a cementitious product.

8. The method of claim 7 in which said clinker is disintegrated in said impact-type disintegrator in such manner that each clinker particle is subjected to 3 to 8 impacts within less than about 0.01 second by beating elements which move at a velocity of at least 15 meters per second.

* * * * *